(12) United States Patent
Mielenhausen (10) Patent No.: US 9,946,781 B2
(45) Date of Patent: Apr. 17, 2018

(54) SYSTEM AND METHOD OF IMPLEMENTING TABLE ALIASES

(71) Applicant: SAP SE, Walldorf (DE)

(72) Inventor: Bjoern Mielenhausen, Plankstadt (DE)

(73) Assignee: SAP SE, Walldorf (DE)

( * ) Notice: Subject to any disclaimer, the term of this patent is extended or adjusted under 35 U.S.C. 154(b) by 429 days.

(21) Appl. No.: 14/728,246

(22) Filed: Jun. 2, 2015

(65) Prior Publication Data

US 2016/0357815 A1 Dec. 8, 2016

(51) Int. Cl.
*G06F 7/00* (2006.01)
*G06F 17/30* (2006.01)

(52) U.S. Cl.
CPC .. *G06F 17/30595* (2013.01); *G06F 17/30424* (2013.01); *G06F 17/30466* (2013.01)

(58) Field of Classification Search
None
See application file for complete search history.

(56) References Cited

U.S. PATENT DOCUMENTS

| | | | | |
|---|---|---|---|---|
| 6,115,704 A * | 9/2000 | Olson | ............... | G06F 17/30595 |
| 7,765,222 B2 * | 7/2010 | Styles | ................. | G06F 17/2247 |
| | | | | 707/759 |
| 8,140,558 B2 * | 3/2012 | Kiefer | ............... | G06F 17/30917 |
| | | | | 707/755 |

OTHER PUBLICATIONS

Manuela Horvat et al, "Common Table Expression-WITH Statement", ResearchGate.net, Jan. 2008, 6 pages.*
Daniel Stuparu et al, "Common Table Expression: Different database systems approach", Journal of Communication and Computer, ResearchGate.net, 2009, 7 pages.*
Marta Burzanska et al, "Pushing Predicates into Recursive SQL Common Table Expression", ADBIS 2009, LNCS 5739, pp. 194-205, 2009.*

* cited by examiner

*Primary Examiner* — Uyen Le
(74) *Attorney, Agent, or Firm* — Schwegman Lundberg & Woesner, P.A.

(57) ABSTRACT

In some example embodiments, a first alias creation statement is received. The first alias creation statement comprises a first table identifier of a first table, a second table identifier of a second table, a first alias identifier, and a first common table expression, and the first common table expression comprises the first table identifier. A first alias for the second table is generated based on the first alias creation statement, with the first alias comprising the first alias identifier and the first common table expression. The first alias is stored as metadata of the second table. A first query statement is received, with the first query statement comprising the second table identifier and the first alias identifier, and the first query statement is rewritten using the first common table expression based on the first alias identifier to generate a first rewritten query statement.

18 Claims, 9 Drawing Sheets

SYSTEM AND METHOD OF IMPLEMENTING TABLE ALIASES

TECHNICAL FIELD

The present application relates generally to the technical field of data processing, and, in various embodiments, to systems and methods of implementing table aliases.

BACKGROUND

In the context of relational databases, a foreign key is a field, or collection of fields, in one table that uniquely identifies a row of another table. The foreign key is defined in a second table, but refers to a primary key in the first table. Foreign key relationships are typically not represented in the metadata of a relational database management system. In situations where the use of an alias is desired, users of a relational database have to include alias creation statements in Data Manipulation Language (DML) statements when entering statements for managing data of the relational database. Such on-demand alias creation and processing complicates DML statements, making the managing of data more difficult for users.

BRIEF DESCRIPTION OF THE DRAWINGS

Some example embodiments of the present disclosure are illustrated by way of example and not limitation in the figures of the accompanying drawings, in which like reference numbers indicate similar elements, and in which.

DETAILED DESCRIPTION

Example methods and systems of implementing table aliases are disclosed. In the following description, for purposes of explanation, numerous specific details are set forth in order to provide a thorough understanding of example embodiments. It will be evident, however, to one skilled in the art that the present embodiments can be practiced without these specific details.

In some example embodiments, a first table creation statement comprising a first table identifier is received, a first table is generated based on the first table creation statement, with the first table being stored in a relational database, a second table creation statement comprising a second table identifier is received, and a second table is generated based on the second table creation statement, with the second table being stored in the relational database.

In some example embodiments, a first alias creation statement of a relational database management language is received. The first alias creation statement comprises the first table identifier of the first table, the second table identifier of the second table, a first alias identifier, and a first common table expression. The first common table expression comprises the first table identifier. A first alias for the second table is generated based on the first alias creation statement, with the first alias comprising the first alias identifier and the first common table expression. The first alias is stored as metadata of the second table in the relational database. A first query statement of the relational database management language is received, with the first query statement comprising the second table identifier and the first alias identifier. The first query statement is rewritten using the first common table expression based on the first alias identifier to generate a first rewritten query statement. The first rewritten query statement is then executed. Other embodiments are within the scope of the present disclosure.

In some example embodiments, the relational database language comprises Structured Query Language (SQL). In some example embodiments, the first table creation statement and the second table creation statement each comprises a Data Definition Language (DDL) statement, and the first query statement comprises a Data Manipulation Language (DML) statement. In some example embodiments, the first table creation statement and the second table creation statement each comprise a CREATE statement, and the first alias creation statement comprises an ALTER statement. In some example embodiments, the ALTER statement comprises an ADD TABLE ALIAS clause and a JOIN clause.

In some example embodiments, receiving a second alias creation statement of the relational database management language is received, with the second alias creation statement comprising the first table identifier, the second table identifier, a second alias identifier, and a second common table expression, and the second common table expression comprising the second table identifier. In some example embodiments, a second alias for the first table is generated based on the second alias creation statement, with the second alias comprising the second alias identifier and the second common table expression, the second alias is stored as metadata of the first table in the relational database, a second query statement of the relational database management language is received, with the second query statement comprising the first table identifier and the second alias identifier, and the second query statement is rewritten using the second common table expression based on the second alias identifier to generate a second rewritten query statement. In some example embodiments, the second rewritten query statement is executed.

The methods or embodiments disclosed herein may be implemented as a computer system having one or more modules (e.g., hardware modules or software modules). Such modules may be executed by one or more processors of the computer system. In some example embodiments, a non-transitory machine-readable storage device can store a set of instructions that, when executed by at least one processor, causes the at least one processor to perform the operations and method steps discussed within the present disclosure.

Figure 1:
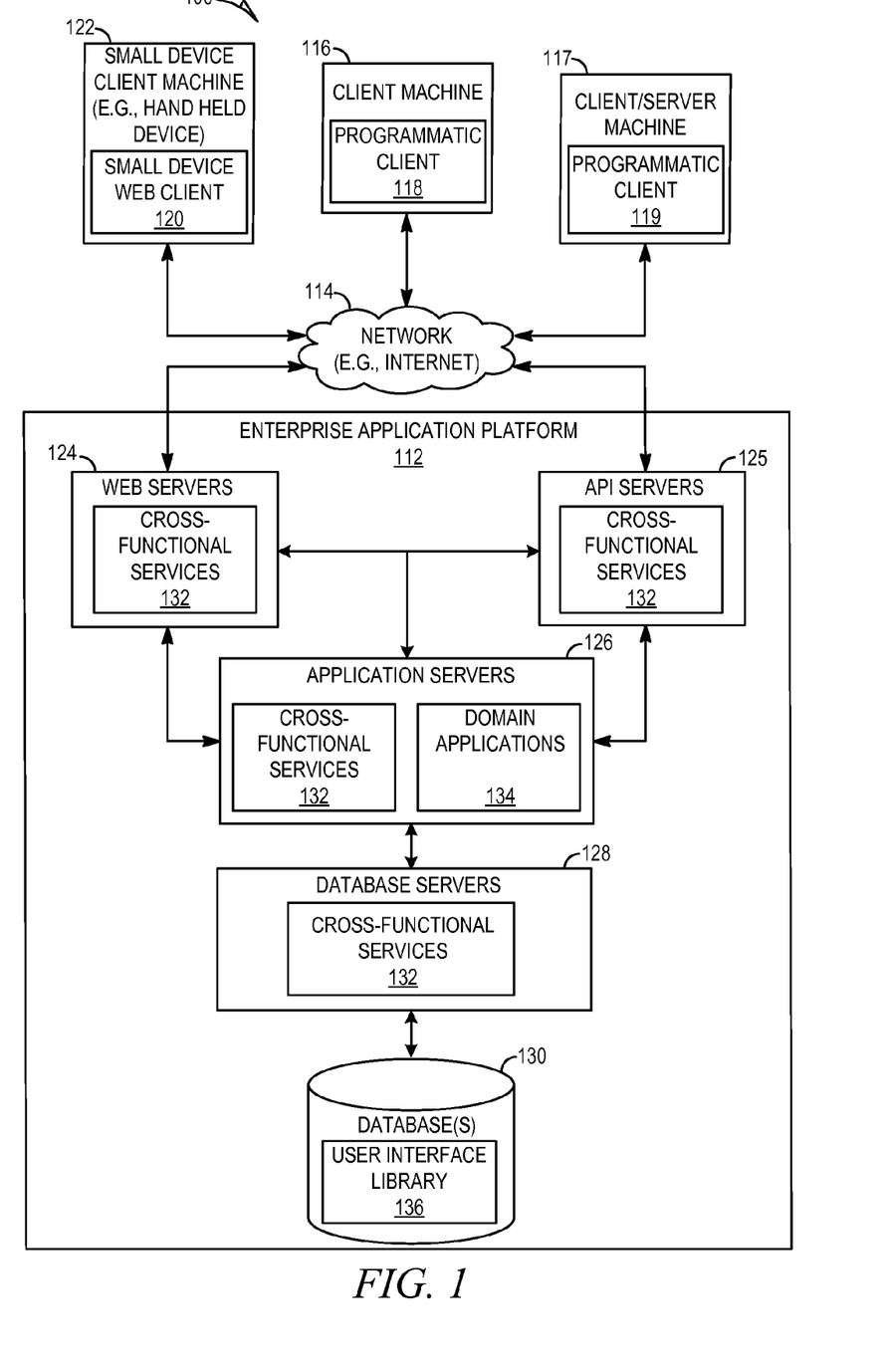
FIG. 1 is a network diagram illustrating a client-server system, in accordance with some example embodiments.

FIG. 1 is a network diagram illustrating a client-server system 100, in accordance with some example embodiments. A platform (e.g., machines and software), in the example form of an enterprise application platform 112, provides server-side functionality, via a network 114 (e.g., the Internet) to one or more clients. FIG. 1 illustrates, for example, a client machine 116 with programmatic client 118 (e.g., a browser), a small device client machine 122 with a small device web client 120 (e.g., a browser without a script engine), and a client/server machine 117 with a programmatic client 119.

Turning specifically to the example enterprise application platform 112, web servers 124 and Application Program Interface (API) servers 125 can be coupled to, and provide web and programmatic interfaces to, application servers 126. The application servers 126 can be, in turn, coupled to one or more database servers 128 that facilitate access to one or more databases 130. The cross-functional services 132 can include relational database modules to provide support services for access to the database(s) 130, which includes a user interface library 136. The web servers 124, API servers 125, application servers 126, and database servers 128 can host cross-functional services 132. The application servers 126 can further host domain applications 134.

The cross-functional services 132 provide services to users and processes that utilize the enterprise application platform 112. For instance, the cross-functional services 132 can provide portal services (e.g., web services), database services and connectivity to the domain applications 134 for users that operate the client machine 116, the client/server machine 117 and the small device client machine 122. In addition, the cross-functional services 132 can provide an environment for delivering enhancements to existing applications and for integrating third-party and legacy applications with existing cross-functional services 132 and domain applications 134. Further, while the system 100 shown in FIG. 1 employs a client-server architecture, the embodiments of the present disclosure are of course not limited to such an architecture, and could equally well find application in a distributed, or peer-to-peer, architecture system.

The enterprise application platform 112 can implement partition level operation with concurrent activities. For example, the enterprise application platform 112 can implement a partition level lock, a schema lock mechanism, manage activity logs for concurrent activity, generate and maintain statistics at the partition level, and efficiently build global indexes. The enterprise application platform 112 is described in greater detail below in conjunction with FIG. 2.

Figure 2:
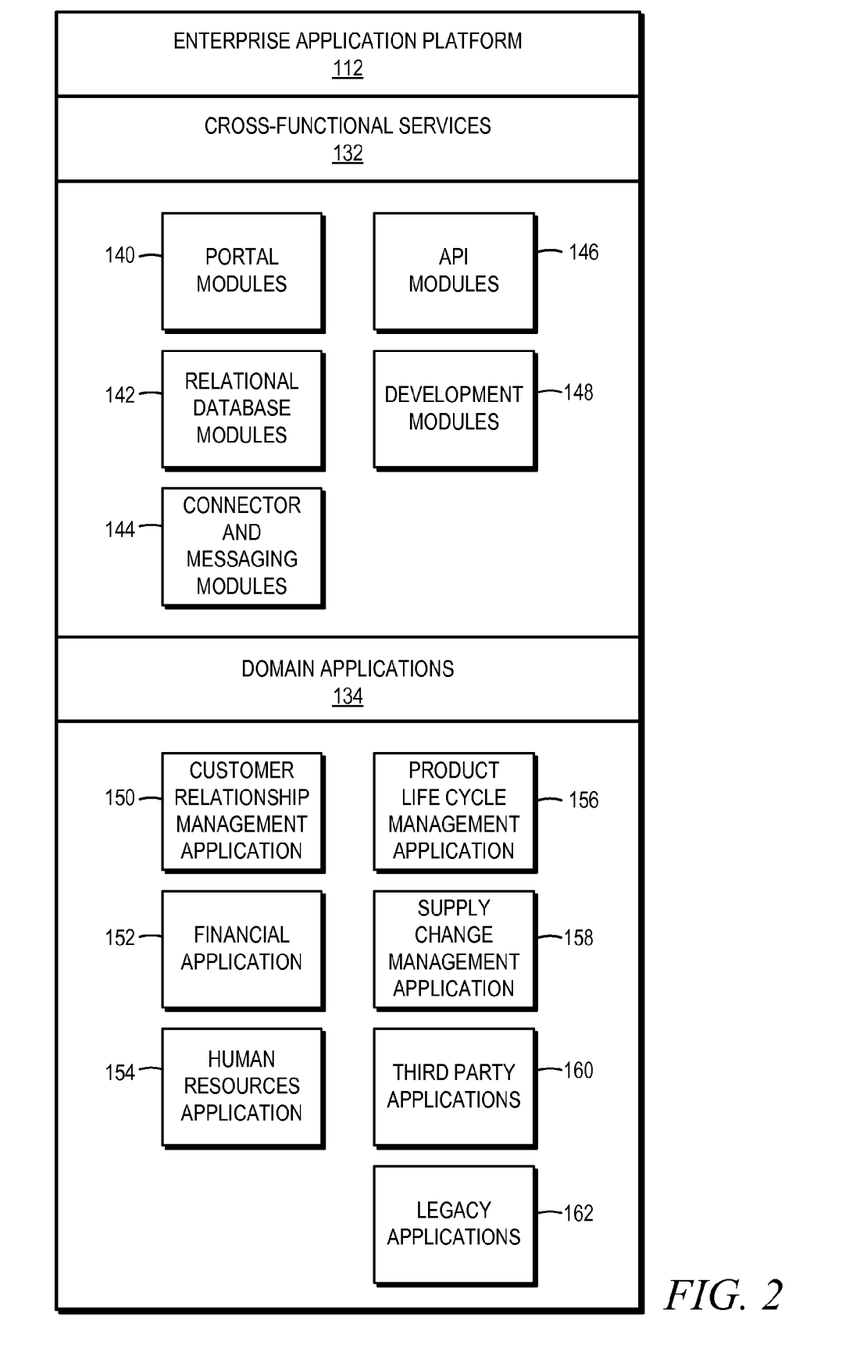
FIG. 2 is a block diagram illustrating enterprise applications and services in an enterprise application platform, in accordance with some example embodiments.

FIG. 2 is a block diagram illustrating enterprise applications and services in an enterprise application platform 112, in accordance with an example embodiment. The enterprise application platform 112 can include cross-functional services 132 and domain applications 134. The cross-functional services 132 can include portal modules 140, relational database modules 142, connector and messaging modules 144, API modules 146, and development modules 148.

The portal modules 140 can enable a single point of access to other cross-functional services 132 and domain applications 134 for the client machine 116, the small device client machine 122, and the client/server machine 117. The portal modules 140 can be utilized to process, author and maintain web pages that present content (e.g., user interface elements and navigational controls) to the user. In addition, the portal modules 140 can enable user roles, a construct that associates a role with a specialized environment that is utilized by a user to execute tasks, utilize services and exchange information with other users and within a defined scope. For example, the role can determine the content that is available to the user and the activities that the user can perform. The portal modules 140 include a generation module, a communication module, a receiving module and a regenerating module. In addition the portal modules 140 can comply with web services standards and/or utilize a variety of Internet technologies including Java, J2EE, SAP's Advanced Business Application Programming Language (ABAP) and Web Dynpro, XML, JCA, JAAS, X.509, LDAP, WSDL, WSRR, SOAP, UDDI and Microsoft .NET.

The relational database modules 142 can provide support services for access to the database(s) 130, which includes a user interface library 136. The relational database modules 142 can provide support for object relational mapping, database independence and distributed computing. The relational database modules 142 can be utilized to add, delete, update and manage database elements. In addition, the relational database modules 142 can comply with database standards and/or utilize a variety of database technologies including SQL, SQLDBC, Oracle, MySQL, Unicode, JDBC, or the like.

The connector and messaging modules 144 can enable communication across different types of messaging systems that are utilized by the cross-functional services 132 and the domain applications 134 by providing a common messaging application processing interface. The connector and messaging modules 144 can enable asynchronous communication on the enterprise application platform 112.

The API modules 146 can enable the development of service-based applications by exposing an interface to existing and new applications as services. Repositories can be included in the platform as a central place to find available services when building applications.

The development modules 148 can provide a development environment for the addition, integration, updating and extension of software components on the enterprise application platform 112 without impacting existing cross-functional services 132 and domain applications 134.

Turning to the domain applications 134, the customer relationship management application 150 can enable access to and can facilitate collecting and storing of relevant personalized information from multiple data sources and business processes. Enterprise personnel that are tasked with developing a buyer into a long-term customer can utilize the customer relationship management applications 150 to provide assistance to the buyer throughout a customer engagement cycle.

Enterprise personnel can utilize the financial applications 152 and business processes to track and control financial transactions within the enterprise application platform 112. The financial applications 152 can facilitate the execution of operational, analytical and collaborative tasks that are associated with financial management. Specifically, the financial applications 152 can enable the performance of tasks related to financial accountability, planning, forecasting, and managing the cost of finance.

The human resource applications 154 can be utilized by enterprise personnel and business processes to manage, deploy, and track enterprise personnel. Specifically, the human resource applications 154 can enable the analysis of human resource issues and facilitate human resource decisions based on real time information.

The product life cycle management applications 156 can enable the management of a product throughout the life cycle of the product. For example, the product life cycle management applications 156 can enable collaborative engineering, custom product development, project management, asset management and quality management among business partners.

The supply chain management applications 158 can enable monitoring of performances that are observed in supply chains. The supply chain management applications 158 can facilitate adherence to production plans and on-time delivery of products and services.

The third-party applications 160, as well as legacy applications 162, can be integrated with domain applications 134 and utilize cross-functional services 132 on the enterprise application platform 112.

The present disclosure provides techniques for implementing table aliases. An alias is a feature of database management languages, such as Structured Query Language (SQL), that provide database administrators, as well as other database users, with the ability to reduce the amount of code required for a query and to make queries generally simpler to understand. In SQL, users can alias tables themselves or columns of a table. A user can temporarily assign another name to a table or column by using an alias.

Currently, user of a relational database use on-demand alias creation, including alias creation statements in DML statements when submitting requests for data management operations. Consider the following example of a small data model with a foreign key relationship. In this example, the following DDL statements are used to create tables:
 CREATE TABLE Customers (ID int, Name char (30));
 CREATE TABLE Orders (ID int, When date, CustomerID int);

Here, a first table called "Customers" is created having a column field labeled "ID" for integer data and a column field labeled "Name" for character data, and a second table called "Orders" is created having a column field labeled "ID" for integer data, a column field labeled "When" for date data, and a column field labeled "CustomerID" for integer data. The user may want the "CustomerID" field in the "Orders" table to be a foreign key for the "ID" field in the "Customers" table. However, the database management system does not have this knowledge of the user's intention for this foreign key relationship. As a result, the user creates an alias to represent this foreign key relationship via a DML statement. For example, the user can enter the following DML statement:
 SELECT Orders.When, Customers.Name FROM Orders JOIN Customers ON Customers.ID=CustomerID;

The present disclosure provides a technique for simplifying the creation of the alias. In some example embodiments, the user can use can define the Common Table Expression (CTE) "JOIN Customers ON Customers.ID=CustomerID" of the alias using a WITH clause:
 WITH Customer AS JOIN Customers ON Customers.ID=CustomerID
 SELECT Orders.When, Customer.Name FROM Orders;

This use of the WITH clause provides a more convenient technique for defining the CTE. However, using this approach, the user must define the CTE of the alias each time the user wants to use the alias (e.g., in each query statement).

In some example embodiments, the respective CTE of an alias is embedded in the definition of the corresponding table as part of a DDL statement, as opposed to being defined in each query statement as part of a DML statement. The implementation of this technique is discussed below.

Figure 3:
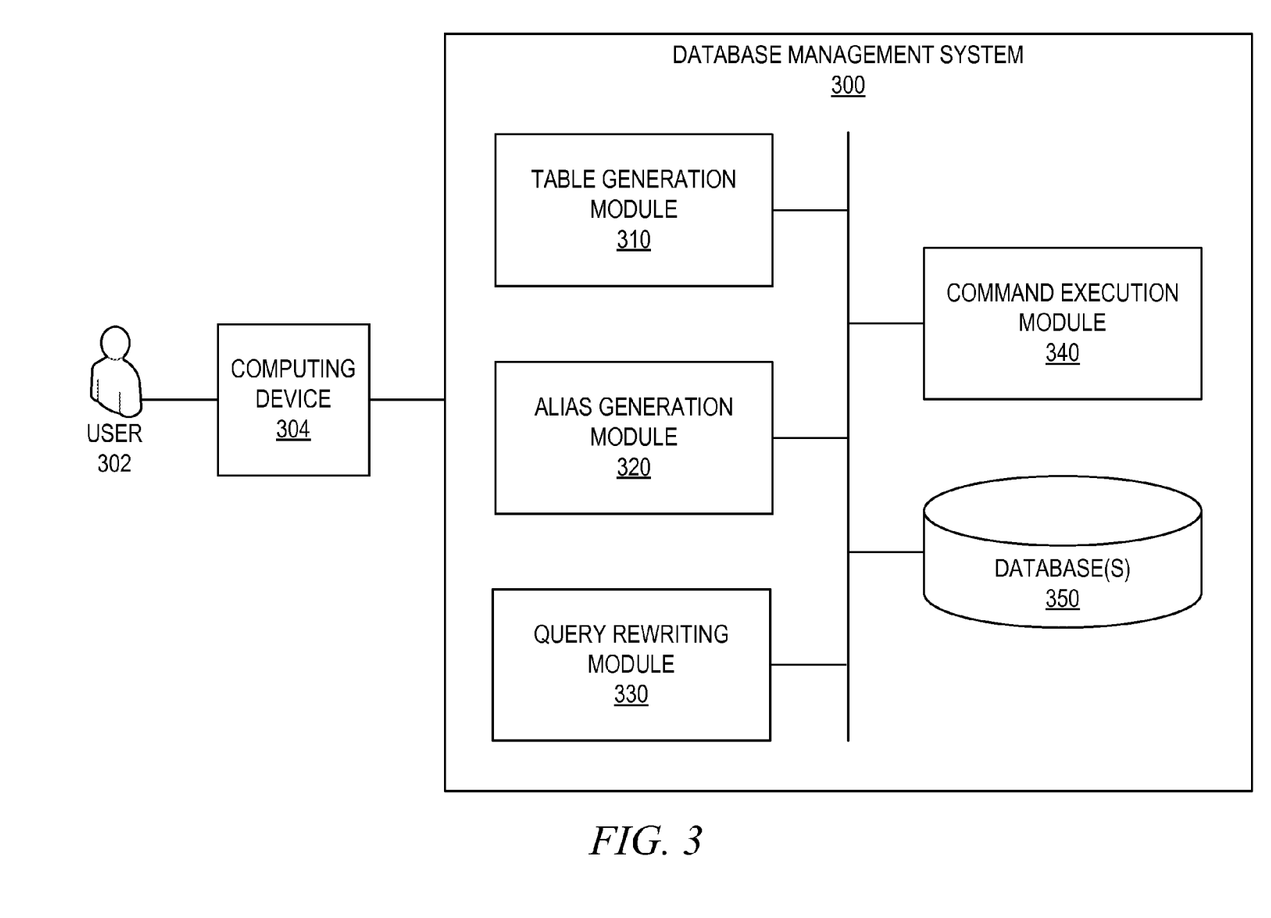
FIG. 3 is a block diagram illustrating a database management system, in accordance with some example embodiments.

FIG. 3 is a block diagram illustrating components of a database management system 300, in accordance with some example embodiments. In some example embodiments, the database management system 300 comprises any combination of one or more of a table generation module 310, an alias generation module 320, a query rewriting module 330, a command execution module 340, and one or more databases 350. In some example embodiments, the database(s) 350 comprise a relational database.

In some example embodiments, the modules 310, 320, 330, and 340, and the database(s) 350 reside on a machine having a memory and at least one processor (not shown). In some example embodiments, the modules 310, 320, 330, and 340, and the database(s) 360 reside on the same machine, while in other example embodiments, one or more of the modules 310, 320, 330, and 340, and the database(s) 350 reside on separate remote machines that communicate with each other via a network (e.g., network 114 in FIG. 1). In some example embodiments, the modules 310, 320, 330, and 340, and the database(s) 360 can be incorporated into the enterprise application platform 112 in FIG. 1 (e.g., on application server(s) 126). However, it is contemplated that other configurations are also within the scope of the present disclosure.

In some example embodiments, the database management system 300 comprises an SQL database management system configured to receive and process SQL statements provided by a user 302 via a computing device 304. Accordingly, in some example embodiments, the modules and other components of the database management system 300 are configured to receive and process SQL statements. It is contemplated that other types of relational database management systems are also within the scope of the present disclosure, and that the module and other components of the database management system 300 can accordingly be configured to receive and process statements of other types of relational database management languages. Computing device 304 can communicate with the database management system 300 (and its modules and other components) via a network (e.g., network 114 in FIG. 1).

In some example embodiments, the table generation module 310 is configured to receive multiple table creation statements, with each table creation statement comprising a corresponding table identifier for identifying a corresponding table that is to be created. The table generation module 310 can be further configured to generate a corresponding table based on the corresponding table creation statement, and to store each generated table in the database(s) 350.

In one example, the following table creation statements are received by the table generation module 310:
 CREATE TABLE Customers (ID int, Name char (30));
 CREATE TABLE Orders (ID int, When date, CustomerID int);

In this example, the first table creation statement comprises table identifier "Customers" for a corresponding first table, and the second table creation statement comprises table identifier "Orders" for a corresponding second table. The table generation module 310 processes (e.g., interprets) these table creation statements and generates the corresponding tables with the identified column fields. In this example, the table generation module 310 generates a first table called "Customers" having a first column field labeled "ID" of type integer and a second column field labeled "Name" of type character, as well as a second table called "Orders" having a first column field labeled "ID" of type integer, a second column field labeled "When" of type date, and a third column field labeled "CustomerID" of type integer. Other embodiments are also within the scope of the present disclosure.

In some example embodiments, the alias generation module 320 is configured to receive one or more alias creation statements, with each alias creation statement comprising a corresponding identifier of a first table and a corresponding identifier of a second table, as well as a corresponding alias identifier and a CTE. In some example embodiments, the CTE comprises the first table identifier. It is noted that the use of the terms "first" and "second" are only used herein to distinguish between two different things, and should not be interpreted to restrict the disclosure or the claims to a particular order of things.

In some example embodiments, the alias generation module 320 is further configured to generate an alias for a table based on the alias creation statement, with the alias comprising the alias identifier and the CTE. The alias generation module 320 can store the alias as metadata of the table in the database(s) 350. Continuing with the example provided above, the following alias creation statement is received by the table generation module 310:

ALTER TABLE Orders ADD TABLE ALIAS Customer AS JOIN Customers ON Customers.ID=CustomerID;

Here, the alias identifier "Customer" is used to generate a corresponding alias having the respective alias CTE "JOIN Customers ON Customers.ID=CustomerID;" which is embedded in the definition of the table "Orders", thereby enabling the database management system 300 to deduce the CTE automatically when appropriate without the user having to provide the CTE each time the user wants to use it in a query statement. As a result, the user can simply provide the following query statement:

SELECT Orders.When, Customer.Name FROM Orders;

In some example embodiments, the query rewriting module 330 is configured to receive a query statement comprising a table identifier and an alias identifier, and to rewrite the query statement using the CTE of the alias corresponding to the alias identifier to generate a rewritten query statement. In the example query statement provided above, the alias identifier "Customer" is used by the query rewriting module 330 to determine the corresponding CTE "JOIN Customers ON Customers.ID=CustomerID;" which is then used by the query rewriting module 330 to rewrite the query statement. In some example embodiments, the rewritten query statement comprises the corresponding CTE or a functional equivalent thereof.

In some example embodiments, the command execution module 340 is configured to execute rewritten query statements. The command execution module 340 can receive the rewritten query statements from the query rewriting module 330. Other embodiments are also within the scope of the present disclosure.

Figure 4A:
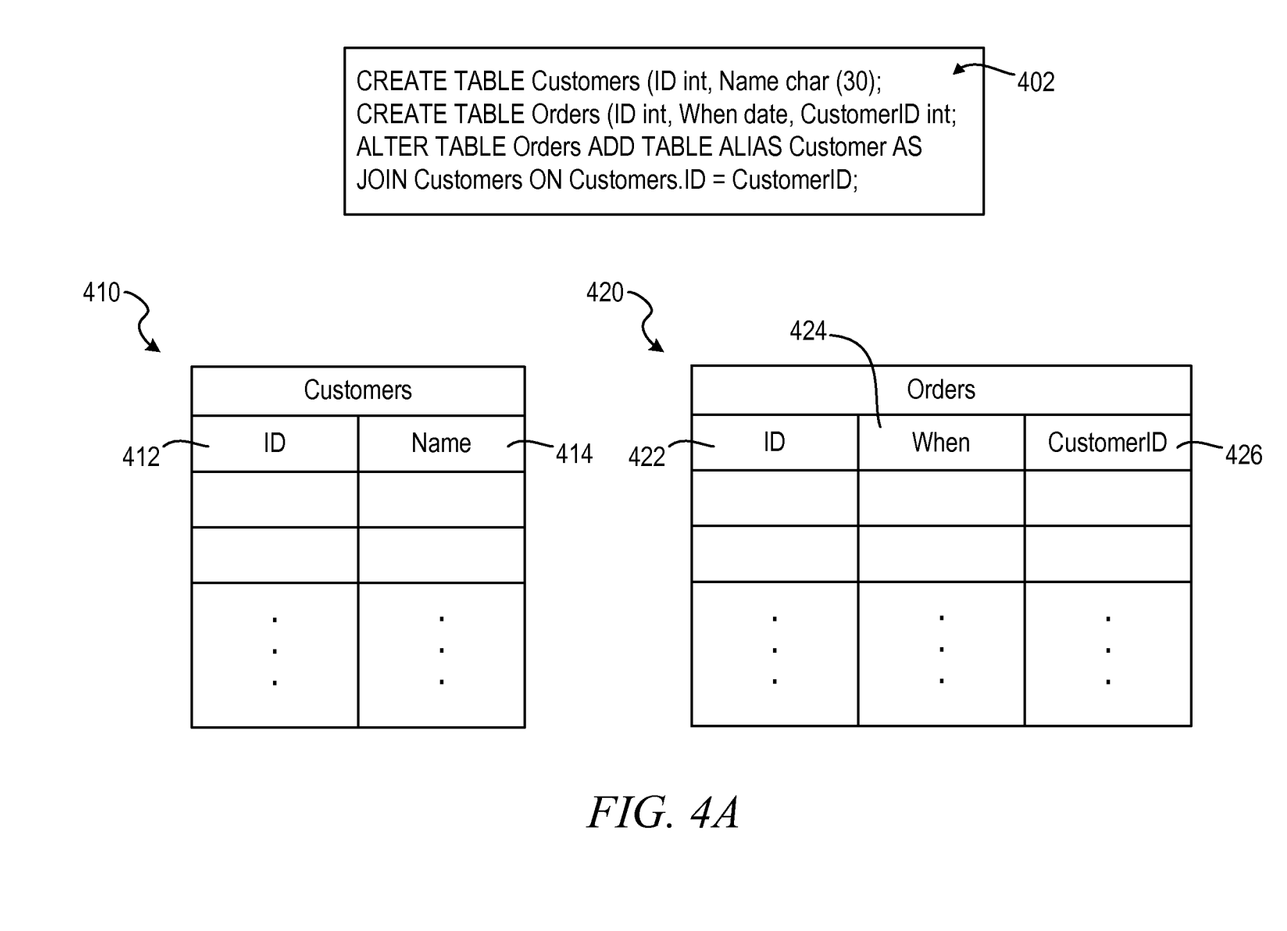
FIGS. 4A and 4B illustrate different stages of implementing a table alias, in accordance with some example embodiments.
Figure 4B:
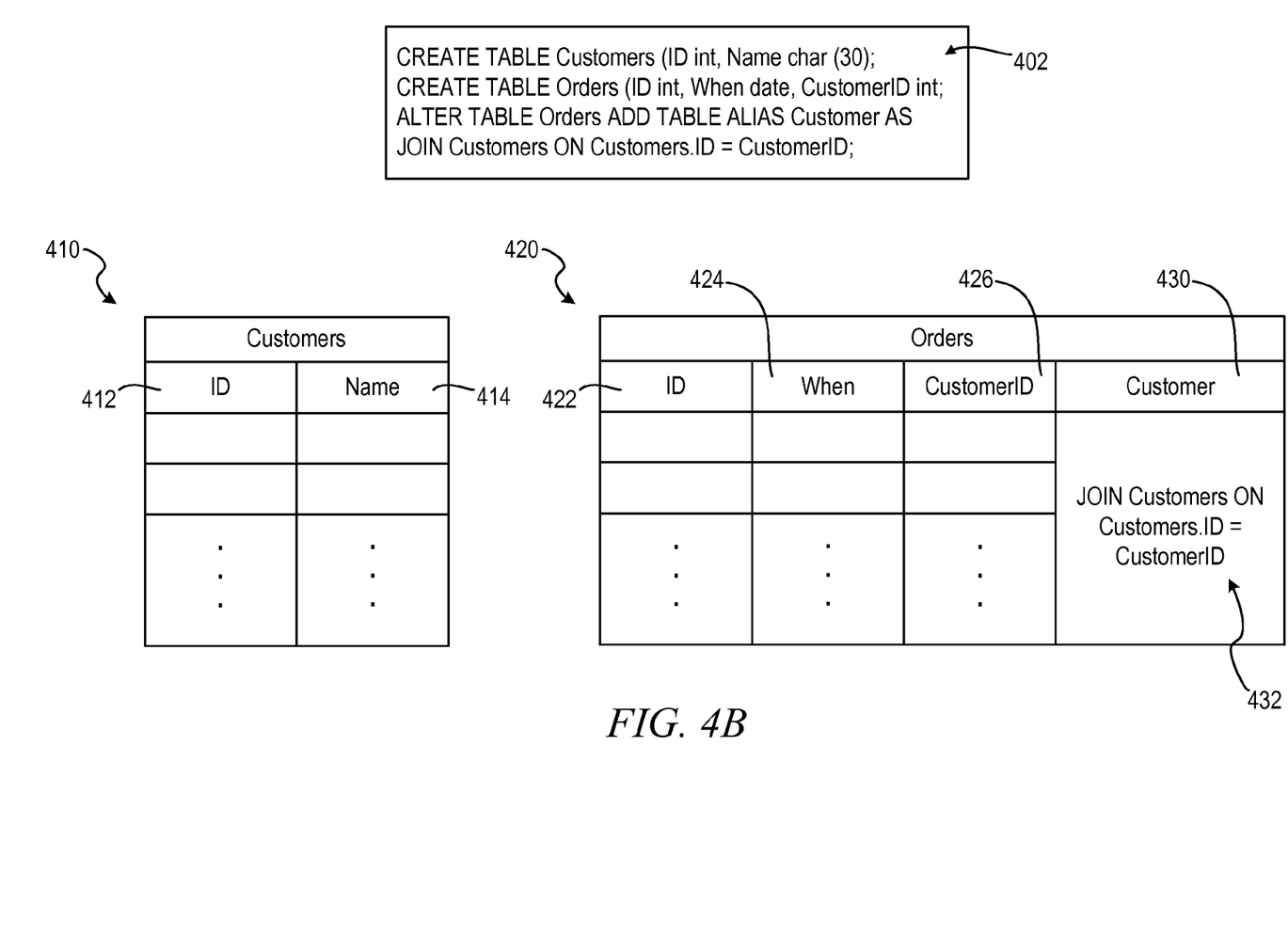

FIGS. 4A and 4B illustrate different stages of implementing a table alias, in accordance with some example embodiments. In FIGS. 4A and 4B, the user has entered three DDL statements 402, having two table creation statements and one alias creation statement:

CREATE TABLE Customers (ID int, Name char (30);
CREATE TABLE Orders (ID int, When date, CustomerID int;
ALTER TABLE Orders ADD TABLE ALIAS Customer AS
JOIN Customers ON Customers.ID=CustomerID;

FIG. 4A shows the result of the table generation module 310 receiving the two table creation statements (CREATE TABLE) and generating corresponding first table 410 and second table 420 based on the two table creation statements. The table generation module 310 generates the first table 410 based on the first table creation statement ("CREATE TABLE Customers (ID int, Name char (30);"). The first table 410 has a first table identifier "Customers" identifying the first table 410, as well as a column field 412 labeled "ID" of type integer and column field 414 labeled "Name" of type character. The table generation module 310 generates the second table 420 based on the second table creation statement ("CREATE TABLE Orders (ID int, When date, CustomerID int;"). The second table 420 has a second table identifier "Orders" identifying the second table 420, as well as a column field 422 labeled "ID" of type integer, column field 424 labeled "When" of type date, and column field 426 labeled "CustomerID" of type integer.

FIG. 4B shows the result of the alias generation module 320 receiving the alias creation statement ("ALTER TABLE Orders ADD TABLE ALIAS Customer AS . . . ") and generating a corresponding alias 430 ("Customer") having the CTE 432 ("JOIN Customers ON Customers.ID=CustomerID") provided in the alias creation statement. The alias generation module 320 stores the alias 430, along with its corresponding CTE 432, as metadata of the second table 420.

In some example embodiments, the alias generation module 320 is configured to generate and store multiple aliases between two tables. Furthermore, in some example embodiments, the alias generation module 320 is configured to generate aliases going in either direction between two tables. For example, in the example embodiment shown in FIG. 4B, another alias (not shown) can be generated for the first table 410 and stored as metadata for the first table 410 based on a corresponding alias creation statement.

Figure 5:
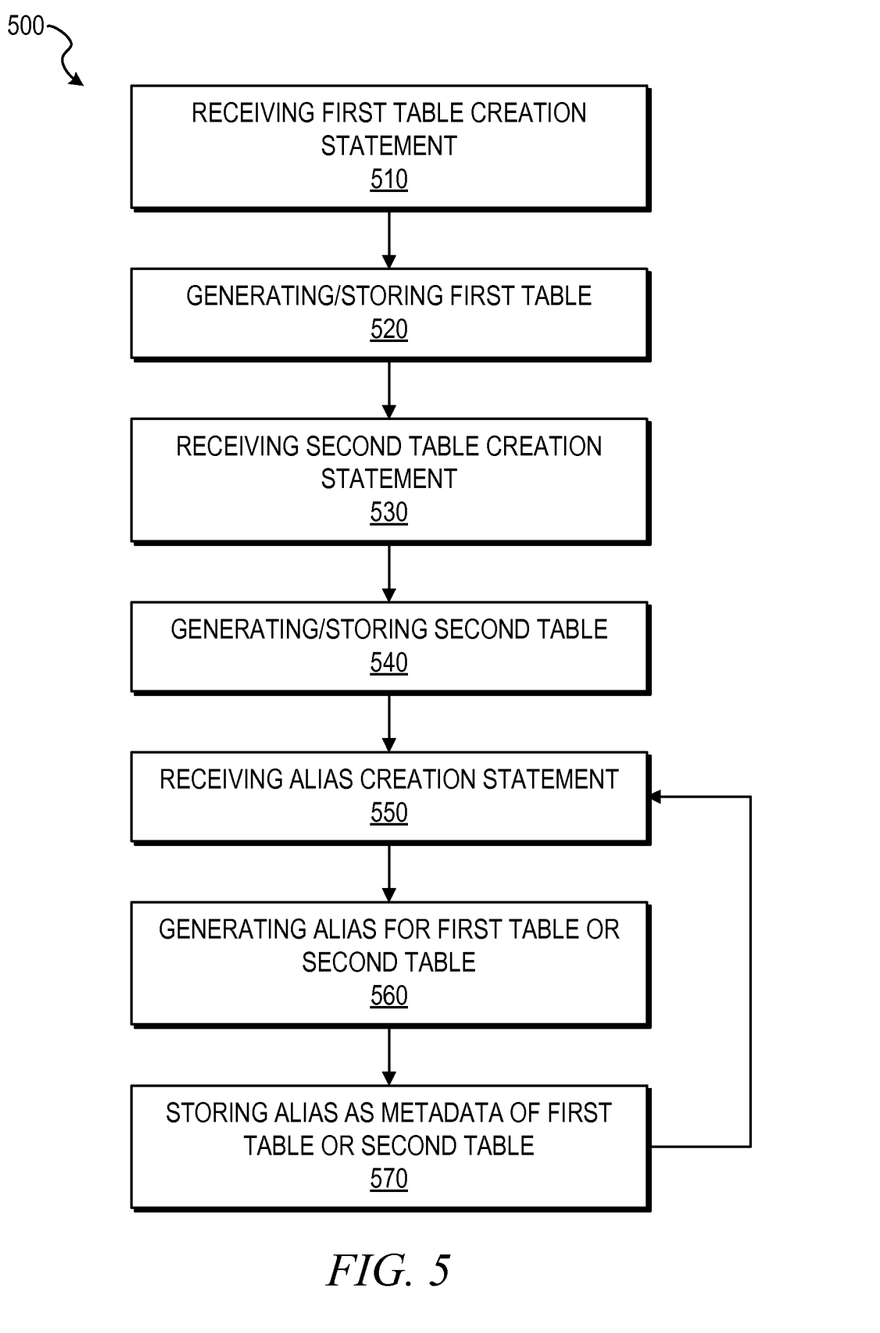
FIG. 5 is a flowchart illustrating a method of implementing table aliases, in accordance with some example embodiments.

FIG. 5 is a flowchart illustrating a method 500 of implementing table aliases, in accordance with some example embodiments. Method 500 can be performed by processing logic that can comprise hardware (e.g., circuitry, dedicated logic, programmable logic, microcode, etc.), software (e.g., instructions run on a processing device), or a combination thereof. In one example embodiment, the method 500 is performed by the database management system 300 of FIG. 3, or any combination of one or more of its components or modules, as described above.

At operation 510, a first table creation statement of a relational database management language (e.g., SQL) is received. The first table creation statement comprises a first table identifier. At operation 520, a first table is generated based on the first table creation statement, with the first table being stored in a relational database. At operation 530, a second table creation statement of the relational database management language is received. The second table creation statement comprises a second table identifier is received. At operation 540, a second table is generated based on the second table creation statement, with the second table being stored in the relational database. At operation 550, a first alias creation statement of the relational database management language is received. The first alias creation statement comprises the first table identifier of the first table, the second table identifier of the second table, a first alias identifier, and a first common table expression. The first common table expression comprises the first table identifier. At operation 560, a first alias for the second table is generated based on the first alias creation statement, with the first alias comprising the first alias identifier and the first common table expression. At operation 570, the first alias is stored as metadata of the second table in the relational database.

In some example embodiments, the method 500 can continue with one or more additional alias creation statements, returning to operation 550. For example, method 500 can return to operation 550, where a second alias creation statement of the relational database management language is received. The second alias creation statement can comprise the first table identifier, the second table identifier, a second alias identifier, and a second common table expression, with the second common table expression comprising the second table identifier. Then, at operation 560, a second alias for the first table can be generated based on the second alias creation statement, with the second alias comprising the second alias identifier and the second common table expression, and the second alias can be stored as metadata of the first table in the relational database at operation 570. Once two tables are generated and stored, any number and direction of aliases can be generated between the two tables.

It is contemplated that any of the other features described within the present disclosure can be incorporated into method 500.

Figure 6:
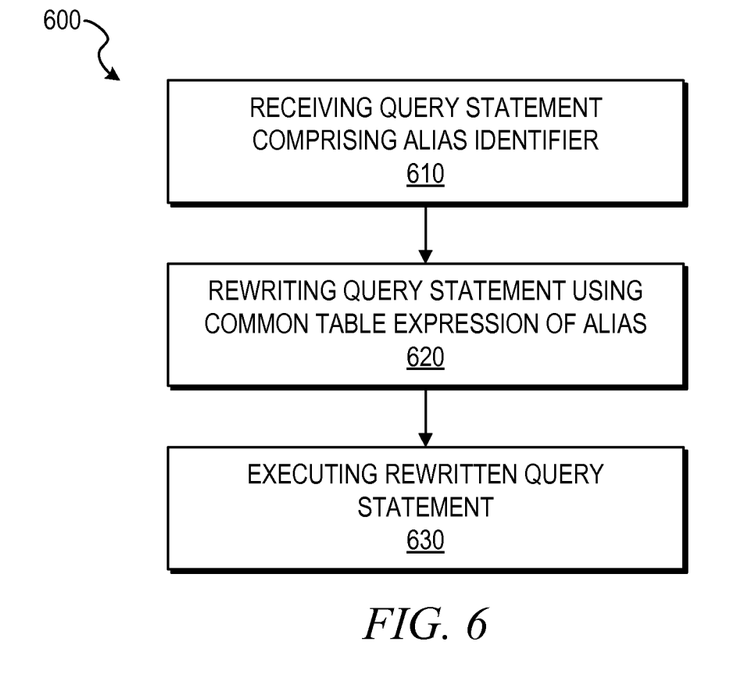
FIG. 6 is a flowchart illustrating another method of implementing table aliases, in accordance with some example embodiments.

FIG. 6 is a flowchart illustrating a method 600 of implementing table aliases, in accordance with some example embodiments. Method 600 can be performed by processing logic that can comprise hardware (e.g., circuitry, dedicated logic, programmable logic, microcode, etc.), software (e.g., instructions run on a processing device), or a combination thereof. In one example embodiment, the method 600 is performed by the database management system 300 of FIG. 3, or any combination of one or more of its components or modules, as described above.

At operation 610, a query statement of a relational database management language (e.g., SQL) is received, with the query statement comprising a table identifier and an alias identifier. At operation 620, the query statement is rewritten using the common table expression determined to correspond to the alias identifier, resulting in a rewritten query statement. At operation 630, the rewritten query statement is executed.

It is contemplated that any of the other features described within the present disclosure can be incorporated into method 600.

The features of including foreign key relationships in the metadata, as disclosed herein, provides the technical advantages of allowing for concise and convenient query syntax, as well as allowing for sophisticated tool support (e.g., automated value help during runtime in the user interface or code completion in the SQL editor at design time). The features of the present disclosure provide other technical advantages as well.

It is contemplated that any features of any embodiments disclosed herein can be combined with any other features of any other embodiments disclosed herein. Accordingly, these any such hybrid embodiments are within the scope of the present disclosure.

Figure 7:
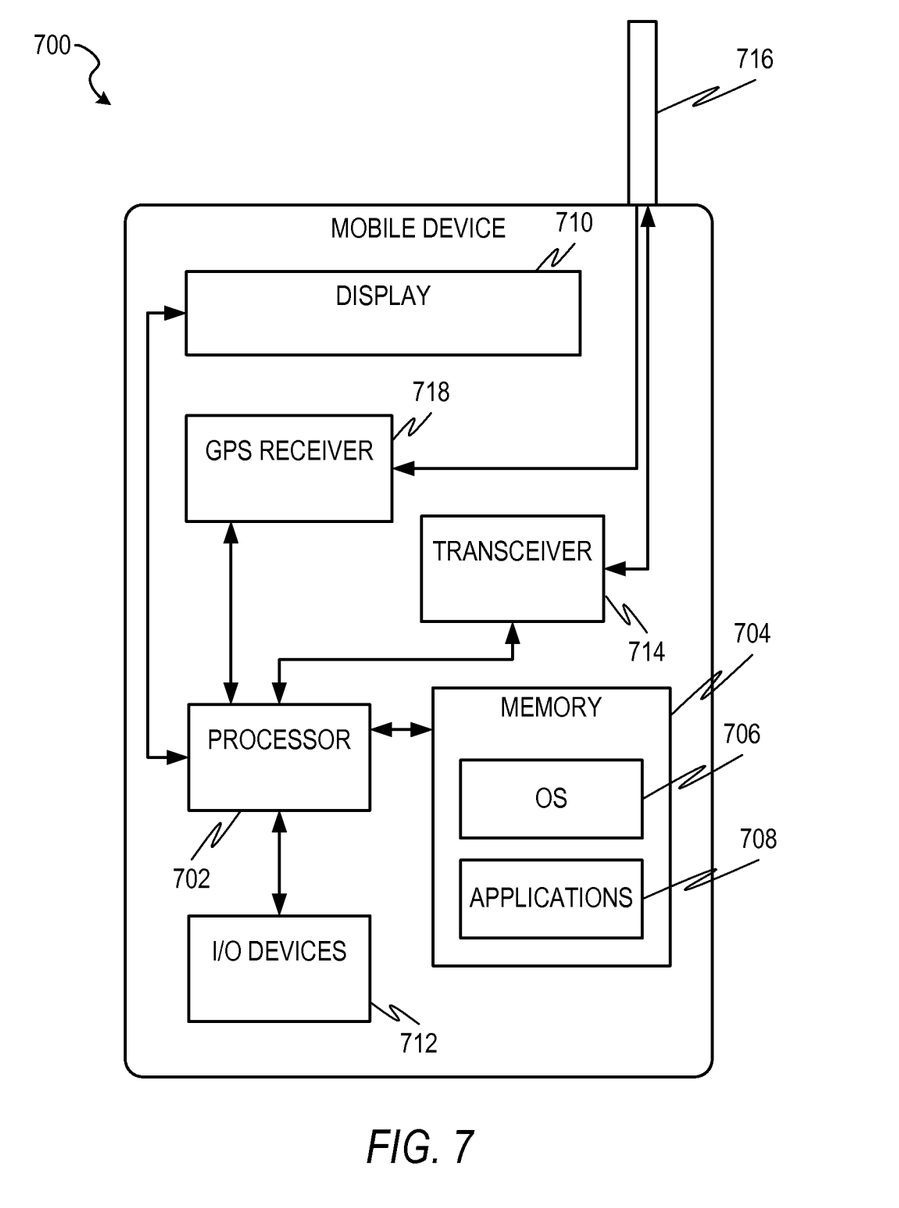
FIG. 7 is a block diagram illustrating a mobile device, in accordance with some example embodiments.

FIG. 7 is a block diagram illustrating a mobile device 700, in accordance with some example embodiments. The mobile device 700 can include a processor 702. The processor 702 can be any of a variety of different types of commercially available processors suitable for mobile devices 700 (for example, an XScale architecture microprocessor, a Microprocessor without Interlocked Pipeline Stages (MIPS) architecture processor, or another type of processor). A memory 704, such as a random access memory (RAM), a Flash memory, or other type of memory, is typically accessible to the processor 702. The memory 704 can be adapted to store an operating system (OS) 706, as well as application programs 708, such as a mobile location enabled application that can provide LBSs to a user. The processor 702 can be coupled, either directly or via appropriate intermediary hardware, to a display 710 and to one or more input/output (I/O) devices 712, such as a keypad, a touch panel sensor, a microphone, and the like. Similarly, in some example embodiments, the processor 702 can be coupled to a transceiver 714 that interfaces with an antenna 716. The transceiver 714 can be configured to both transmit and receive cellular network signals, wireless data signals, or other types of signals via the antenna 716, depending on the nature of the mobile device 700. Further, in some configurations, a GPS receiver 718 can also make use of the antenna 716 to receive GPS signals.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the network 104 of FIG. 1) and via one or more appropriate interfaces (e.g., APIs).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

A computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Figure 8:
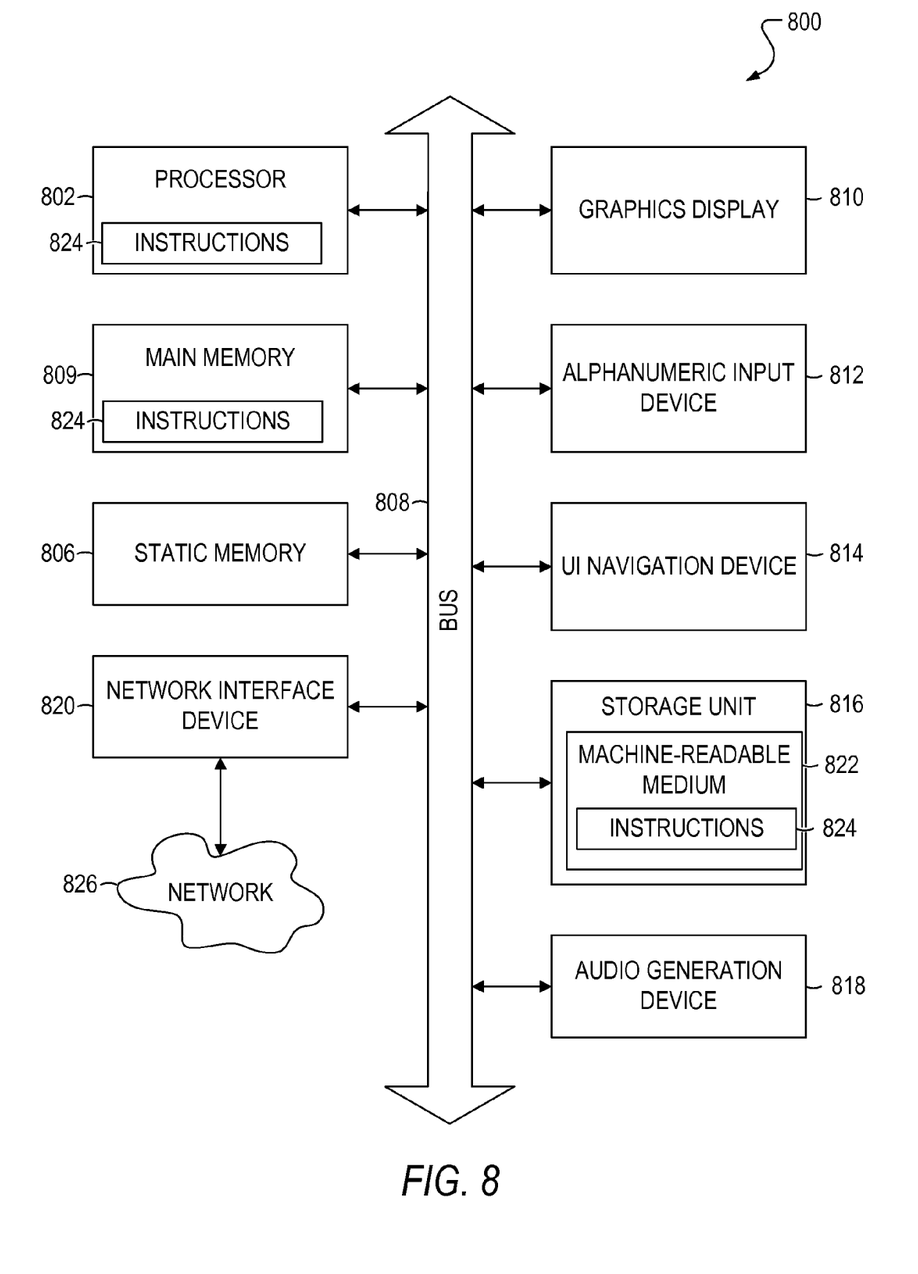
FIG. 8 is a block diagram of an example computer system on which methodologies described herein can be executed, in accordance with some example embodiments.

FIG. 8 is a block diagram of a machine in the example form of a computer system 800 within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor 802 (e.g., a central processing unit (CPU), a graphics processing unit (GPU) or both), a main memory 804 and a static memory 806, which communicate with each other via a bus 808. The computer system 800 may further include a graphics or video display unit 810 (e.g., a liquid crystal display (LCD) or a cathode ray tube (CRT)). The computer system 800 also includes an alphanumeric input device 812 (e.g., a keyboard), a user interface (UI) navigation (or cursor control) device 814 (e.g., a mouse), a storage unit (e.g., a disk drive unit) 816, an audio or signal generation device 818 (e.g., a speaker), and a network interface device 820.

The storage unit 816 includes a machine-readable medium 822 on which is stored one or more sets of data structures and instructions 824 (e.g., software) embodying or utilized by any one or more of the methodologies or functions described herein. The instructions 824 may also reside, completely or at least partially, within the main memory 804 and/or within the processor 802 during execution thereof by the computer system 800, the main memory 804 and the processor 802 also constituting machine-readable media. The instructions 824 may also reside, completely or at least partially, within the static memory 806.

While the machine-readable medium 822 is shown in an example embodiment to be a single medium, the term "machine-readable medium" may include a single medium or multiple media (e.g., a centralized or distributed database, and/or associated caches and servers) that store the one or more instructions 824 or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

The instructions 824 may further be transmitted or received over a communications network 826 using a transmission medium. The instructions 824 may be transmitted using the network interface device 820 and any one of a number of well-known transfer protocols (e.g., HTTP). Examples of communication networks include a LAN, a WAN, the Internet, mobile telephone networks, POTS networks, and wireless data networks (e.g., WiFi and WiMax networks). The term "transmission medium" shall be taken to include any intangible medium capable of storing, encoding, or carrying instructions for execution by the machine, and includes digital or analog communications signals or other intangible media to facilitate communication of such software.

Each of the features and teachings disclosed herein can be utilized separately or in conjunction with other features and teachings to provide a system and method for selective gesture interaction using spatial volumes. Representative examples utilizing many of these additional features and teachings, both separately and in combination, are described in further detail with reference to the attached figures. This detailed description is merely intended to teach a person of skill in the art further details for practicing preferred aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

Some portions of the detailed descriptions herein are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the below discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but is not limited to, any type of disk, including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The example methods or algorithms presented herein are not inherently related to any particular computer or other apparatus. Various general purpose systems, computer servers, or personal computers may be used with programs in accordance with the teachings herein, or it may prove convenient to construct a more specialized apparatus to perform the required method steps. The required structure for a variety of these systems will appear from the description below. It will be appreciated that a variety of programming languages may be used to implement the teachings of the disclosure as described herein.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system comprising:
    at least one processor; and
    a non-transitory computer-readable medium storing executable instructions that, when executed, cause the at least one processor to perform operations comprising:
        receiving a first alias creation statement of a relational database management language, the first alias creation statement comprising a first table identifier of a first table, a second table identifier of a second table, a first alias identifier, and a first common table expression, the first common table expression comprising the first table identifier, the first alias creation statement comprising an ALTER statement, the ALTER statement comprising an ADD TABLE ALIAS clause and a JOIN clause,
        generating a first alias for the second table based on the first alias creation statement, the first alias comprising the first alias identifier and the first common table expression; and
        storing the first alias as metadata of the second table in a relational database;
        receiving a first query statement of the relational database management language, the first query statement comprising the second table identifier and the first alias identifier; and
        rewriting the first query statement using the first common table expression based on the first alias identifier to generate a first rewritten query statement.

2. The system of claim 1, wherein the operations further comprise:
    receiving a first table creation statement comprising the first table identifier;
    generating the first table based on the first table creation statement, the first table being stored in the relational database;
    receiving a second table creation statement comprising the second table identifier; and
    generating the second table based on the second table creation statement, the second table being stored in the relational database.

3. The system of claim 2, wherein the first table creation statement and the second table creation statement each comprises a Data Definition Language (DDL) statement, and the first query statement comprises a Data Manipulation Language (DML) statement.

4. The system of claim 2, wherein the relational database language comprises Structured Query Language (SQL).

5. The system of claim 4, wherein the first table creation statement and the second table creation statement each comprise a CREATE statement.

6. The system of claim 1, wherein the operations further comprise executing the first rewritten query statement.

7. The system of claim 1, wherein the operations further comprise:
    receiving a second alias creation statement of the relational database management language, the second alias creation statement comprising the first table identifier, the second table identifier; a second alias identifier, and a second common table expression, the second common table expression comprising the second table identifier;
    generating a second alias for the first table based on the second alias creation statement, the second alias comprising the second alias identifier and the second common table expression;
    storing the second alias as metadata of the first table in the relational database; and
    receiving a second query statement of the relational database management language, the second query statement comprising the first table identifier and the second alias identifier; and
    rewriting the second query statement using the second common table expression based on the second alias identifier to generate a second rewritten query statement.

8. The system of claim 7, wherein the operations further comprise executing the second rewritten query statement.

9. A computer-implemented method comprising:
    receiving a first alias creation statement of a relational database management language, the first alias creation statement comprising a first table identifier of a first table, a second table identifier of a second table, a first alias identifier, and a first common table expression, the first common table expression comprising the first table identifier, the first alias creation statement comprising an ALTER statement, the ALTER statement comprising an ADD TABLE ALIAS clause and a JOIN clause;
    generating a first alias for the second table based on the first alias creation statement, the first alias comprising the first alias identifier and the first common table expression;
    storing the first alias as metadata of the second table in a relational database;
    receiving a first query statement of the relational database management language, the first query statement comprising the second table identifier and the first alias identifier; and
    rewriting, by a machine having a memory and at least one processor, the first query statement using the first common table expression based on the first alias identifier to generate a first rewritten query statement.

10. The method of claim 9, further comprising:
    receiving a first table creation statement comprising the first table identifier;
    generating the first table based on the first table creation statement, the first table being stored in the relational database;
    receiving a second table creation statement comprising the second table identifier; and generating the second table based on the second table creation statement, the second table being stored in the relational database.

11. The method of claim 10, wherein the relational database language comprises Structured Query Language (SQL).

12. The method of claim 10, wherein the first table creation statement and the second table creation statement each comprises a Data Definition Language (DDL) statement, and the first query statement comprises a Data Manipulation Language (DML) statement.

13. The method of claim 12, wherein the first table creation statement and the second table creation statement each comprise a CREATE statement.

14. The method of claim 9, further comprising executing the first rewritten query statement.

15. The method of claim 9, further comprising:
receiving a second alias creation statement of the relational database management language, the second alias creation statement comprising the first table identifier, the second table identifier, a second alias identifier, and a second common table expression, the second common table expression comprising the second table identifier;
generating a second alias for the first table based on the second alias creation statement, the second alias comprising the second alias identifier and the second common table expression;
storing the second alias as metadata of the first table in the relational database;
receiving a second query statement of the relational database management language, the second query statement comprising the first table identifier and the second alias identifier; and
rewriting the second query statement using the second common table expression based on the second alias identifier to generate a second rewritten query statement.

16. The method of claim 15, further comprising executing the second rewritten query statement.

17. A non-transitory machine-readable storage medium, tangibly embodying a set of instructions that, when executed by at least one processor, causes the at least one processor to perform operations comprising:
receiving a first alias creation statement of a relational database management language, the first alias creation statement comprising a first table identifier of a first table, a second table identifier of a second table, a first alias identifier, and a first common table expression, the first common table expression comprising the first table identifier; the first alias creation statement comprising an ALTER statement, the ALTER statement comprising an ADD TABLE ALIAS clause and a JOIN clause;
generating a first alias for the second table based on the first alias creation statement, the first alias comprising the first alias identifier and the first common table expression;
storing the first alias as metadata of the second table in a relational database;
receiving a first query statement of the relational database management language, the first query statement comprising the second table identifier and the first alias identifier; and
rewriting the first query statement using the first common table expression based on the first alias identifier to generate a first rewritten query statement.

18. The storage medium of claim 17, wherein the operations further comprise:
receiving a first table creation statement comprising the first table identifier, the first table creation statement comprising a first Data Definition Language (DDL) statement;
generating the first table based on the first table creation statement, the first table being stored in the relational database;
receiving a second table creation statement comprising the second table identifier, the second table creation statement comprising a second DDL statement; and
generating the second table based on the second table creation statement, the second table being stored in the relational database,
wherein the first query statement comprises a Data Manipulation Language (DML) statement.

* * * * *